H. BERTRAM.
DOUGH DIVIDING AND WORKING MACHINE.
APPLICATION FILED DEC. 10, 1914.
1,150,655.
Patented Aug. 17, 1915.
Fig. 1.
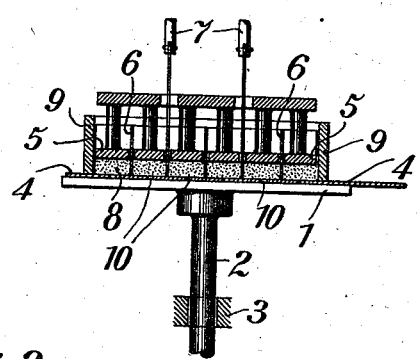
Fig. 5.
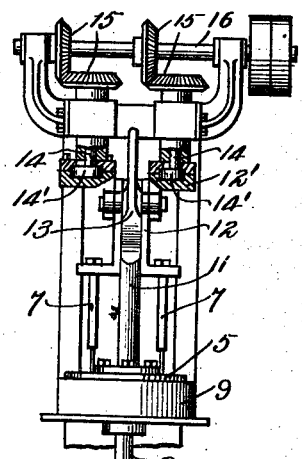
Fig. 2.
Fig. 3.
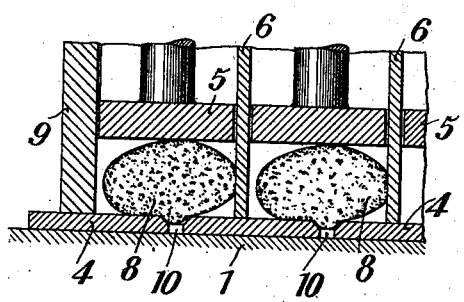
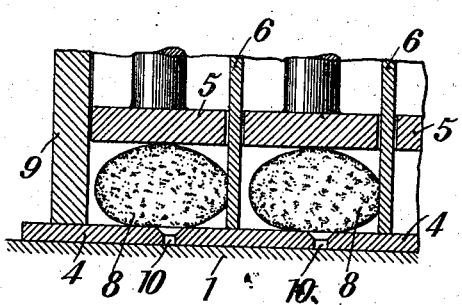
Fig. 4.
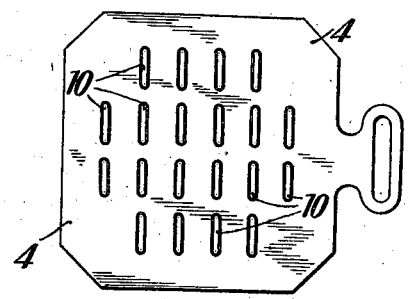
Witnesses:
Charles A. Mathé
Oscar Rabmubbon
Inventor:
Hermann Bertram
by
John Lyka
Attorney.

UNITED STATES PATENT OFFICE.

HERMANN BERTRAM, OF HALLE-ON-THE-SAALE, GERMANY.

DOUGH DIVIDING AND WORKING MACHINE.

1,150,655.  Specification of Letters Patent.  Patented Aug. 17, 1915.

Application filed December 10, 1914. Serial No. 876,529.

*To all whom it may concern:*

Be it known that I, HERMANN BERTRAM, a citizen of the German Empire, and resident of Halle-on-the-Saale, Germany, have invented certain new and useful Improvements in Dough Dividing and Working Machines, of which the following is a specification.

My invention relates to improvements in dough dividing and working machines, such as are used for molding the divided batches of dough into the form of loaves, rolls or the like by rolling the same between two plates having circular or similar movements relatively to each other, and the object of the improvements is to provide a machine in which the means for holding the divided dough on the bottom plate are constructed in such a way, that a uniform dough is produced.

With this object in view my invention consists in the matters to be described hereinafter and particularly pointed out in the appended claims.

For the purpose of explaining the invention two examples embodying the same have been shown in the accompanying drawing, in which the same letters of reference have been used in all the views to indicate corresponding parts.

In said drawing—Figure 1, is a vertical section of the table for receiving the dough and the cutting and molding head, Fig. 2, is a vertical section showing a part of the table and cutting and molding head on an enlarged scale, the leaves or rolls being shown partly molded, Fig. 3, is a similar section showing the loaves or rolls as they appear at the end of the molding operation, Fig. 4, is a plan view of a modified form of the dough supporting plate, and Fig. 5 is a general view of the machine, illustrating particularly the mechanism for producing the circular or gyratory movement.

As the general construction of the machine is known to those skilled in the art, and my invention relates more particularly to the construction of the molding apparatus, I have shown only the dough supporting table and the dividing apparatus which coöperate in molding the dough.

Referring to the example illustrated in Figs. 1 to 3, the improved apparatus comprises a table 1 which is supported on a central rod 2 having sliding support in a suitable bearing 3. On the table there is a plate 4 which is adapted to receive the dough. Above the table a pressing head 5 is suitably supported which is divided by longitudinal and transverse slits into several sections. Through the said slits cutting knives 6 in the form of a basket can be passed downward and into the dough placed on the plate 4. The knives are secured to rods 7. The pressing head is inclosed between the side walls of a frame 9.

In the position of the parts shown in Fig. 1, a batch of dough has been placed on the plate 4 and cut into sections by forcing the table 1 upward and against the pressing head 5 and the knives 6, and the sections of the dough fill out the sections formed between the pressing head 5, the plate 4 and the knives 6. The dough which has thus been divided into sections is now worked by imparting relative circular or gyratory movement to the table and pressing head; that is to say, a movement in which every point of the table performs relatively to the pressing head a movement of exactly the same shape and extent in the form of a closed curve.

Referring now to the construction to which my invention more particularly relates, the plate 4 is formed with recesses or holes 10 one for each of the compartments provided by the knives. The extent of the circular or other gyratory movement is such that each hole will never be carried beyond the confines of the particular compartment with which it registers, but will remain in communication with this one compartment during the entire operation. Therefore, when the pressing head and table are forced toward each other as has been described above, each of the said holes is filled out by dough, and after beginning the circular working or molding operation the dough is gradually pulled out of the holes, so that after a while the batches assume the forms shown in Fig. 2. As shown in this figure, each batch 8 is being pressed by one of the knives against the side wall of the hole 10, so that it is rolled on the upper circumference of the hole. In the preferred form the holes are exactly cylindrical only at their lower portions, but their upper edges are faceted (beveled) or rounded; still, the horizontal cross section of the holes will be circular at every point thereof (in this preferred form of the holes). Therefore during the whole working operation the batches are pressed against the walls and rounded upper parts of the holes, so that the working operation resembles very much the working by hand, and the completed loaf corresponds in form to the loaf which has been formed by hand.

As appears more particularly from Fig. 2, the part of the dough which fills out the holes 10 is retracted therefrom and enters into the mass of dough after a short working operation, so that the rolls or loaves have a complete form, as is shown in Fig. 3. This operation is materially assisted by making the holes with rounded upper edges, because in this case the particles of dough which are within the holes are more easily retracted and brought into the mass of dough.

The improved form of the plate 4 is suitable in machines in which the table and pressing head perform exactly circular relative movements, and also in such machines in which oval or oblong loaves are made in which case the movement is not circular but oval or oblong. In the latter case I prefer to construct the plate 4 in the manner shown in Fig. 4 in which the holes have oblong forms. In either case the outline of the recess or hole will thus correspond to the outline of a horizontal cross section of the loaf.

The pressure which is exerted on the dough by the walls of the holes and the rounded portions thereof depends on the height and breadth of the said holes. Therefore the batches of dough are held by the said holes more or less according to the size of the said holes. Where the batches of dough to be worked are comparatively heavy and large, I use plates 4 in which the holes are comparatively deep and which are therefore comparatively thick.

By providing the plate 4 with holes the particles of the dough which are pressed into the same and which have the function to hold the dough in position in the working operation are retracted from the holes in the progress of the working operation, so that these particles also are treated in the same way as the main part of the dough. Thereby it is not possible, that the worked dough contains particles which have not uniformly been treated and which tend to become hard.

It will be observed that the holes 10 extend entirely through the plate 4, and since this plate obviously is not set air-tight upon the table 1, it follows that even when the upper ends of the holes are closed by the dough, their lower ends or lower portions are open to, or in communication with, the surrounding air. This has a two-fold advantage: First, when the dough is applied on top of the plate 4, the air is expelled from the holes through their lower ends so that the dough can fill such holes with a nearer approach to complete filling than if I used recesses having closed bottoms (in which case a body of air would be trapped at the bottom of each recess so as to prevent the filling of such recess). Second, during the working of the dough, the portions extending into the holes 10 are retracted much more readily because air will enter below the dough through the lower end of the hole as the dough is removed, and there will be no danger of creating a partial vacuum.

Any suitable mechanism may be employed for producing the circular or gyratory movement which kneads the dough. As an example of such mechanism, I have reproduced in Fig. 5, the leading features of the construction disclosed in German Letters Patent No. 265,960 of June 16, 1911. The pressing head 5 is secured rigidly to a rod or standard 11 movable vertically within a sleeve 12 to which the knife-carrying rods 7 are secured rigidly. On this sleeve is mounted to swing about a horizontal pivot, a lever 13 provided adjacent to its pivot with teeth in engagement with rack teeth on the rod 11. The sleeve 12 is open at one side as shown, and is connected rigidly with brackets 12' provided with circular sockets for the reception of circular cams 14', which are secured rigidly (and eccentrically) to the lower ends of shafts 14, said eccentrics being incased in the sockets of the brackets 12' so as to support the sleeve 12 and all parts connected therewith, yet this entire mechanism is suspended freely so as to perform a horizontal gyratory movement when the two shafts 14 are rotated, by means of gearing 15, from a drive shaft 16.

I claim herein as my invention:

1. In a dough working machine, the combination with a dough supporting member, of a dough working member disposed substantially parallel to the supporting member, and means for imparting relative working movement to the said supporting and working members, said supporting member being formed at least with one hole into which a part of the dough can be pressed, the lower portion of said hole being open to the surrounding air even when the upper end of said hole is closed.

2. In a dough working machine, the combination with a dough supporting member, of a dough working member disposed substantially parallel to the supporting member, and means for imparting relative working movement to the said supporting and working members, said supporting member being formed at least with one hole with faceted upper edges into which a part of the dough can be pressed.

3. In a dough dividing and working machine, the combination with a dough supporting member, of a dough dividing and working member disposed substantially parallel to the supporting member, and means for imparting relative working movement to the said supporting and working members, said supporting member being formed with holes one for each of the compartments provided by the dividing member and adapted to receive the parts of the dough.

4. In a dough-working machine, the combination with a dough-supporting member having a hole extending entirely therethrough from its upper to its lower surface, of a dough-working member arranged above said supporting member, and means for imparting relative movement to said members.

5. In a dough working machine, the combination with a table, of a removable dough-supporting plate adapted to rest on said table and having through-holes whose lower ends are adjacent to said table, a dough-working member arranged above said table, and means for imparting relative movement to said members.

6. In a dough-working machine, the combination with a dough-supporting member provided with a recess extending from its upper surface and having a lower portion in communication with the outside air even when the upper end of the recess is closed by the dough, of a dough-working member arranged above said supporting member, and means for imparting relative movement to said members.

7. In a comparted dough-working machine, the combination with a comparted dough-working member, of a dough-supporting member arranged beneath said working member and provided with dough-engaging recesses, and means for imparting to said members, relative movement of such an extent that each recess will remain in registry with the same compartment of the working member during the entire working movement.

8. In a comparted dough-working machine, the combination with a comparted dough-working member, of a dough-supporting member arranged beneath said working member and provided with a plurality of recesses one for each of the compartments of the working member, said recesses being adapted for registry with the respective compartments of the working member, and means for imparting to said members, relative movement of such an extent that each recess will remain in communication with the same compartment of the working member during the entire working movement.

9. In a dough-working machine, the combination with a dough-supporting member having a recess the outline of which corresponds to the outline of a horizontal cross section of the loaf to be produced, of a dough-working member arranged above said supporting member, and means for imparting to said members, a relative movement the path of which is shaped to correspond to the outline of said recess.

In testimony whereof, I have signed this specification in the presence of two subscribing witnesses.

HERMANN BERTRAM.

Witnesses:
 RUDOLPH FRICKE,
 ALICE DUNGER.